United States Patent
Lee (10) Patent No.: US 6,170,758 B1
(45) Date of Patent: Jan. 9, 2001

(54) MULTIFUNCTIONAL AIR GUN

(75) Inventor: Howang Woo Lee, Changwon (KR)

(73) Assignee: Nambu Co., Ltd. (KR)

( * ) Notice: Under 35 U.S.C. 154(b), the term of this patent shall be extended for 0 days.

(21) Appl. No.: 09/476,902

(22) Filed: Jan. 3, 2000

(30) Foreign Application Priority Data

May 20, 1999 (KR) .............................................. 1999-9022

(51) Int. Cl.⁷ ..................................................... B05B 9/00
(52) U.S. Cl. ........................ 239/124; 239/434; 239/570; 239/DIG. 21
(58) Field of Search .................................... 239/124, 398, 239/407, 433, 434, 569, 570, 583, DIG. 13, DIG. 21, DIG. 22

(56) References Cited

U.S. PATENT DOCUMENTS

| | | | |
|---|---|---|---|
| 4,867,380 | * | 9/1989 | Sibbertsen .............................. 239/398 |
| 5,248,097 | * | 9/1993 | Kardell ................................... 239/583 |
| 6,032,878 | * | 3/2000 | Lacroiz et al. ......................... 239/583 |

* cited by examiner

Primary Examiner—Andres Kashnikow
Assistant Examiner—Lisa Ann Douglas
(74) Attorney, Agent, or Firm—Galgano & Burke (57) ABSTRACT

A multifunctional air gun, designed to be operable in a sucking mode, a blowing mode or a sucking and blowing mode, is disclosed. In the air gun, a tubular body has an on/off valve unit in addition to upper and lower openings communicating with each other. A fixed spool is set within the upper opening of the tubular body and connects the air supply tube to an air jet pipe while controlling the flowing direction of compressed air. A vacuum valve unit is set within the lower opening of the tubular body and is assembled with suction and exhaust nozzles at both ends while allowing the two nozzles to communicate with each other. The vacuum valve unit vacuumizes the interior of the two nozzles due to the compressed air. A first control knob is assembled with the fixed spool to control the compressed air for the vacuum valve unit, thus controlling the suction force generated by the compressed air for the vacuum valve unit. A second control knob is assembled with the fixed spool to control the compressed air for the air jet pipe while controlling the blowing force generated by the compressed air for the air jet pipe.

17 Claims, 9 Drawing Sheets

MULTIFUNCTIONAL AIR GUN

BACKGROUND OF THE INVENTION

1. Field of the Invention

The present invention relates, in general, to air guns utilizing the action of compressed air and, more particularly, to a multifunctional air gun designed to selectively perform a sucking operation, a blowing operation, or the two operations at the same time as desired.

2. Description of the Prior Art

As well known to those skilled in the art, a plurality of machines utilizing the action of compressed air, for example, vacuum cleaners, blowers, air guns and air pumps, have been proposed and widely used. Conventional machines utilizing the action of compressed air are designed to perform an individual function. That is, vacuum cleaners or air guns are typically used for removing impurities, such as dust and dirty liquid, from desired objects in a variety of industrial areas, such as motor-maintenance areas. On the other hand, air pumps are typically used in changing the cutting oils in machine tools or in changing the engine oils in automobiles. In addition, the vacuum cleaners and the air guns may be used for removing a variety of impurities, such as dust and chips, generated during a cutting operation of machine tools.

However, the conventional machines utilizing the action of compressed air are not designed to perform a sucking operation and a blowing operation using one machine, but are designed to always perform only one of the two operations. This forces a user to purchase two machines, or a vacuum cleaner and an air gun, with excessive money paid for the machines, and forces the user to waste time while performing the two operations.

In an effort to overcome such a problem, a multifunctional air gun, designed to perform a sucking operation and a blowing operation, has been proposed and marketed by a Japanese company, Osawa Co., Ltd. However, Osawa's multifunctional air gun (hereinbelow, referred to simply as "the first conventional air gun") is problematic in that it is impossible to control the flow rate of compressed air in the air gun. In the first conventional air gun, a nozzle is set in a tubular body, acting as a compressed air passage sucking impurities into the gun, with a cap covering the nozzle. Six holes, individually having a diameter of 1.4 mm, are formed on an area between the nozzle and the cap, with the flow rate of compressed air being determined by the six holes.

That is, the first conventional air gun is not provided with a separate blowing device, but a blowing air control knob with a blowing pipe is provided at the top of the tubular body of the air gun. The above air gun thus has a desired blowing function in addition to a sucking function, and removes impurities through a sucking operation and a blowing operation.

However, the first conventional air gun is problematic in that the diameter of the six holes determining the flow rate of compressed air is not variable, but is fixed, and so it is impossible for a user to control the flow rate of compressed air, or the suction force of the air gun, when necessary. Therefore, the above air gun fails to effectively remove some impurities, such as large-sized particles and chips, from desired objects. Another problem experienced in the above multifunctional air gun resides in that the air gun is not designed to selectively perform either of the two operations, thus being regrettably limited in use. Particularly, it is impossible for the above air gun to remove impurities through a blowing operation.

The inventor of this invention proposed a multifunctional air gun provided with a blowing function in addition to a sucking function in Korean Utility Model Application No. 98-22,633.

The above Korean multifunctional air gun (hereinbelow, referred to simply as "the second conventional air gun") is designed to selectively perform either of the sucking and blowing operations or perform the two operations at the same time as desired. In addition, the second conventional air gun is designed to be controllable in the flow rate of compressed air when necessary. The second conventional air gun thus somewhat effectively overcomes the problems experienced in the first conventional air gun. However, this air gun is problematic in that it is provided with a plurality of separate valves giving inconvenience to users. Another problem of the second conventional air gun resides in that it has a complex construction, with an increased number of parts being easily broken. Due to the increased number of parts, the production cost is increased while manufacturing the multifunctional air guns.

SUMMARY OF THE INVENTION

Accordingly, the present invention has been made keeping in mind the above problems occurring in the prior art, and an object of the present invention is to provide a multifunctional air gun, which is designed to selectively perform a sucking operation, a blowing operation, or the two operations at the same time as desired, with both the operational mode of the air gun and the flow rate of compressed air being easily controllable.

Another object of the present invention is to provide a multifunctional air gun, which has a simple construction suitable for reducing the production cost while manufacturing the air guns.

In order to accomplish the above object, the present invention provides a multifunctional air gun, comprising: a tubular body provided with an on/off valve unit for controlling a supplying of compressed air from an air supply tube, the tubular body also having upper and lower openings communicating with each other; a fixed spool set within the upper opening of the tubular body, the fixed spool connecting the air supply tube to an air jet pipe while controlling a flowing direction of the compressed air; a vacuum valve unit set within the lower opening of the tubular body and assembled with an impurity suction nozzle and an impurity exhaust nozzle at both ends thereof while allowing the suction and exhaust nozzles to communicate with each other, the vacuum valve unit adapted for vacuumizing the interior of the two nozzles due to the compressed air supplied from the fixed spool; a first control knob assembled with the fixed spool and adapted for controlling the compressed air flowing from the fixed spool into the vacuum valve unit while controlling a suction force generated by the compressed air for the vacuum valve unit; and a second control knob assembled with the fixed spool and adapted for controlling the compressed air flowing from the spool into the air jet pipe while controlling a blowing force generated by the compressed air for the air jet pipe.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

FIGS. 1 to 8 are views, showing the construction and operation of a multifunctional air gun provided with a blowing function in addition to a sucking function in accordance with the preferred embodiment of this invention. As shown in the drawings, the air gun of this invention comprises a vacuum valve unit 50, which generates a vacuum using compressed air so as to suck a variety of impurities, such as dust and chips, from desired objects into an impurity exhaust duct 62. A fixed spool 10 is set in the air gun at a position above the vacuum valve unit 50 and feeds compressed air from air supply tube 70 to both a front air jet pipe 75 and the vacuum valve unit 50. Two air control knobs, or first and second control knobs 20 and 30, are commonly assembled with the fixed spool 10 and control the flow rates of compressed air for the air jet pipe and the vacuum valve unit. All the vacuum valve unit 50, the two air control knobs 20 and 30 and the fixed spool 10 are firmly assembled with a tubular body 40, with a grip 44 being provided at the rear end of the body 40. An on/off valve unit 80 is exteriorly set on the grip 44 of the tubular body 40 and controls flow of the compressed air fed from the air supply tube 70 to the fixed spool 10.

The construction of the air gun of this invention will be described in more detail.

In the air gun of this invention, the tubular body 40, carrying all the parts of the gun, has a grip 44 at its rear end and is provided with two parallel axial openings, or upper and lower cylindrical openings (designated by no numerals in the drawings). The vacuum valve unit 50 is set in the front end of the lower cylindrical opening of the body 40, while an impurity exhaust nozzle 60 is set in the rear end of the body 40. A suction tube 65, having a gently downwardly curved configuration, is connected to the front end of the vacuum valve unit 50, while the impurity exhaust duct 62 is connected to the rear end of the impurity exhaust nozzle 60. The above impurity exhaust duct 62 extends to a dust collector (not shown). An annular groove 52 is exteriorly and circumferentially formed on the rear end portion of the vacuum valve unit 50, thus forming an annular cavity between the valve unit 50 and the tubular body 40 when the valve unit 50 is set in the lower cylindrical opening of the tubular body 40. A plurality of nozzle holes 54 are formed on the valve unit 50 while extending from the rear wall of the annular groove 52 backwardly to the rear end of the valve unit 50. In such a case, the nozzle holes 54 are gently inclined downwardly in a rear direction at an angle of inclination, thus communicating with the interior of the impurity exhaust nozzle 60 at a position around the interior wall of the nozzle 60.

Figure 1:
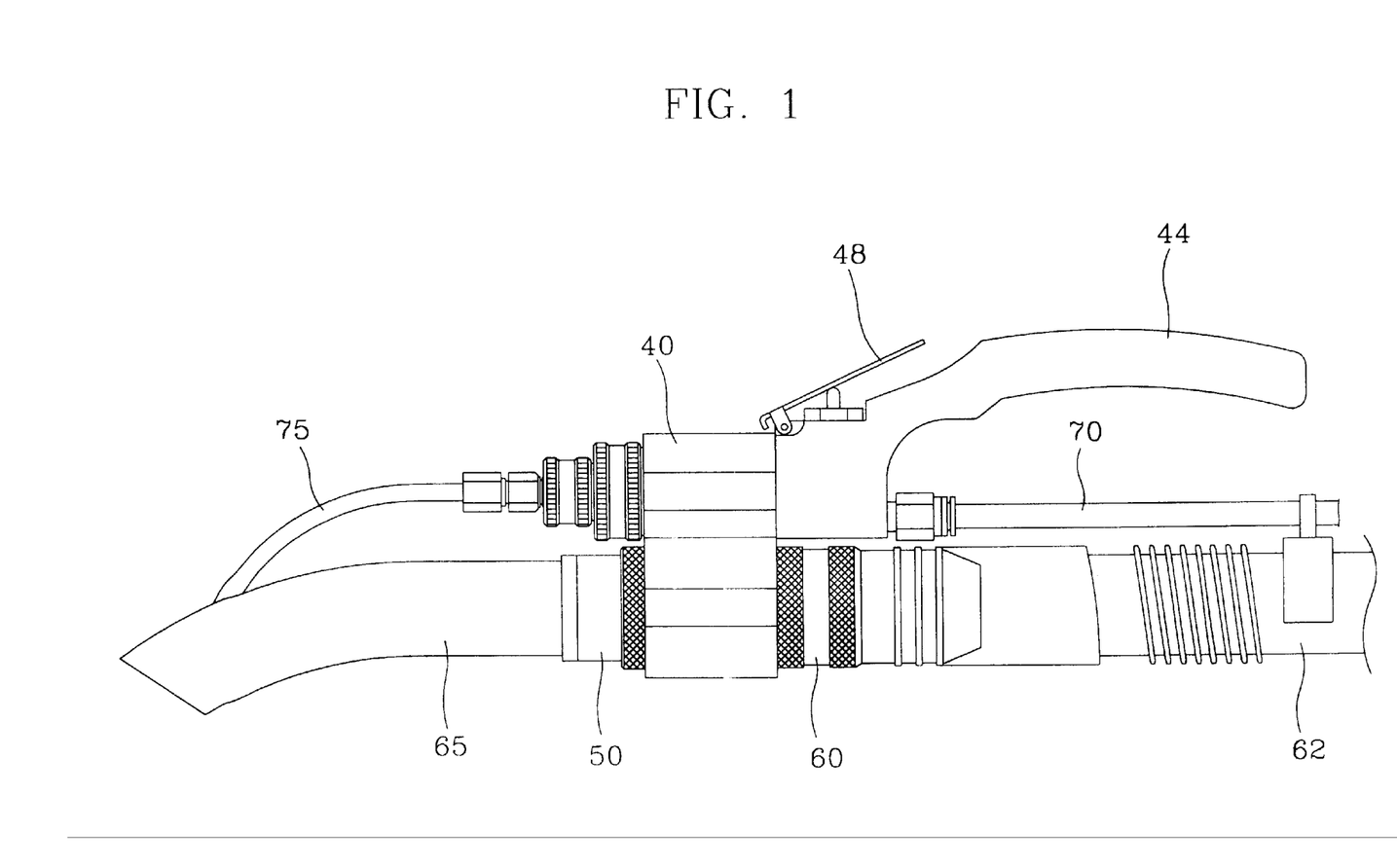
FIG. 1 is a front view, showing the appearance of a multifunctional air gun in accordance with the preferred embodiment of the present invention.
Figure 2:
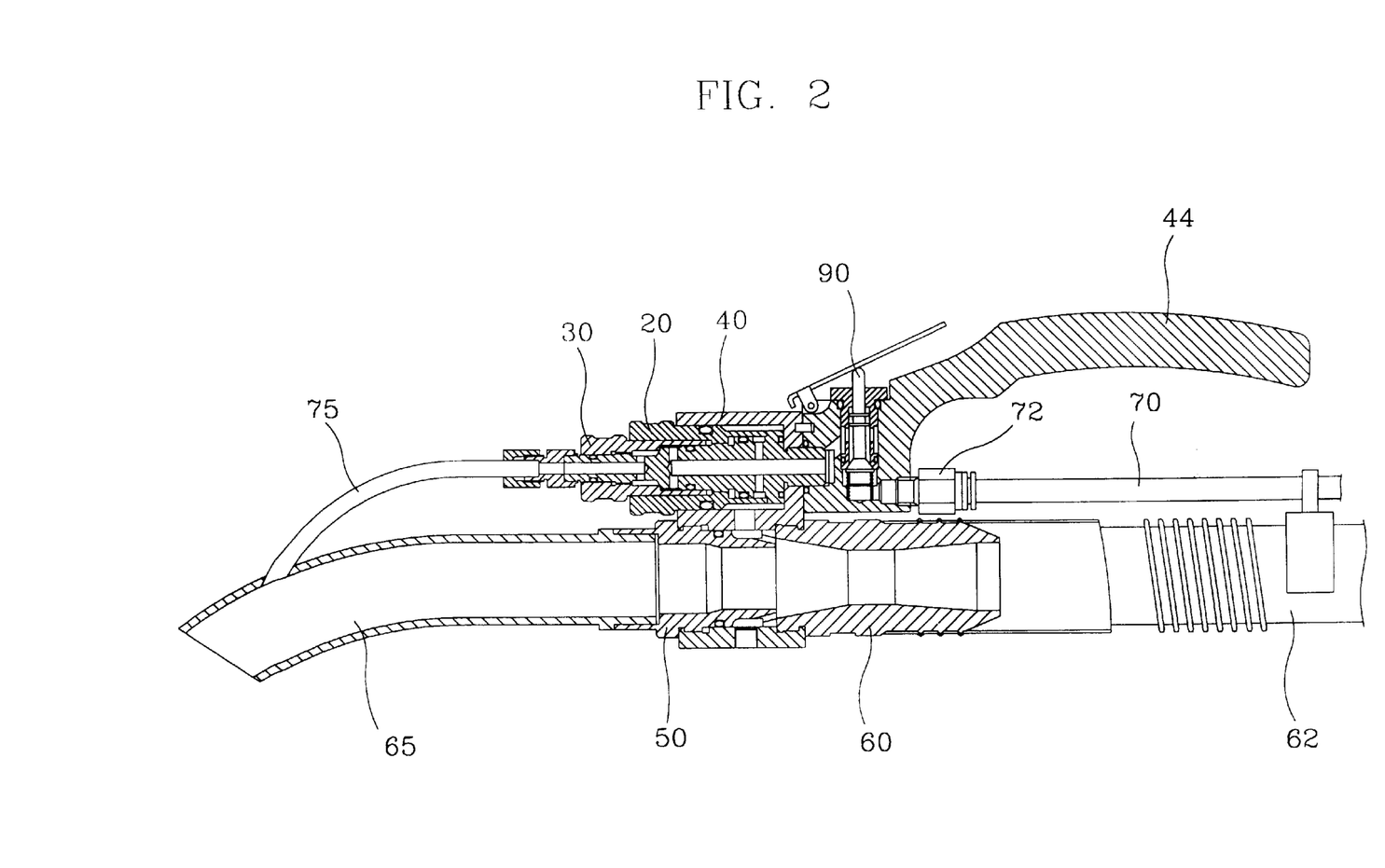
FIG. 2 is a sectional view, showing the construction of the air gun of FIG. 1.
Figure 3:
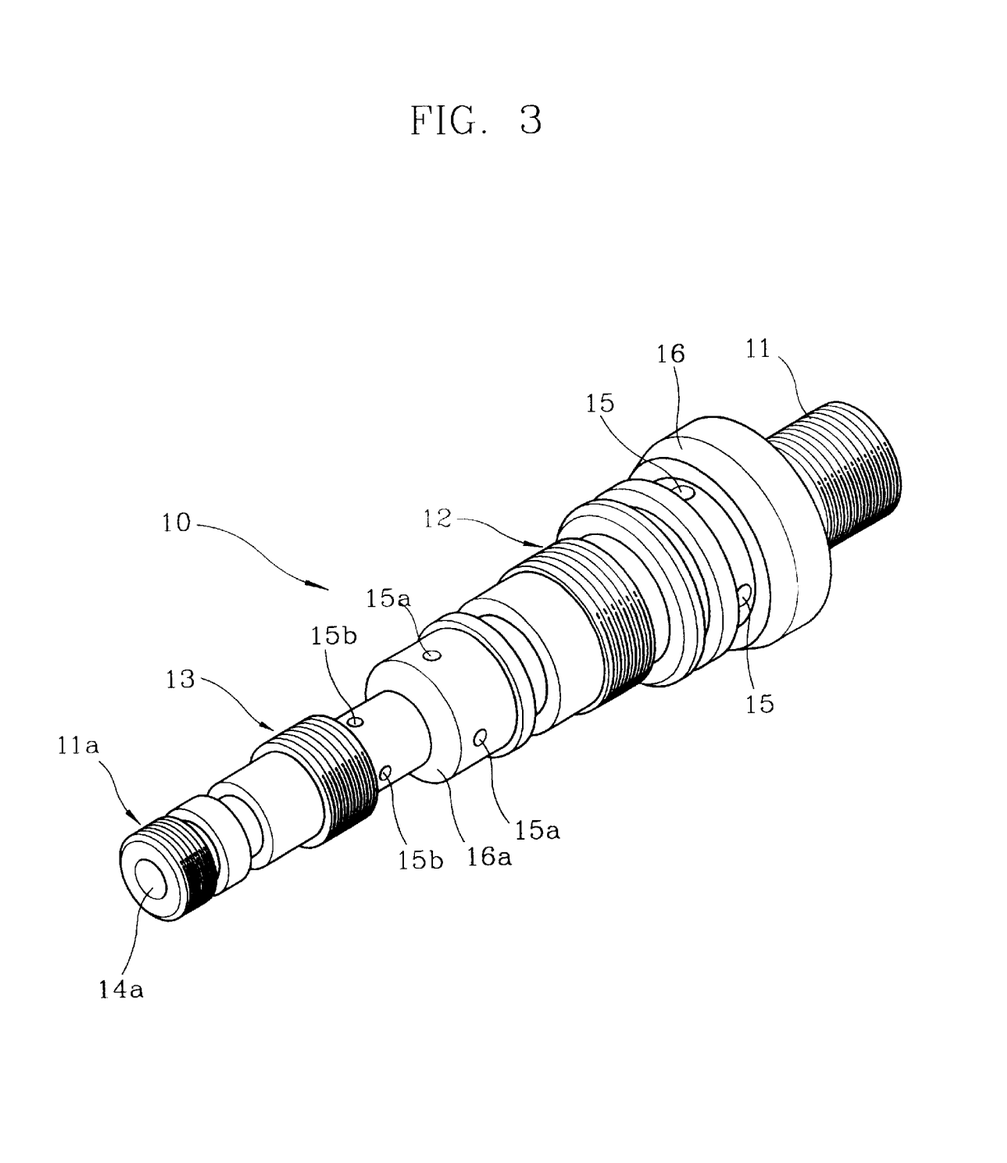
FIG. 3 is a perspective view of a fixed spool set in the air gun of FIG. 1.

The fixed spool 10, having first and second external threads 11 and 11a at both ends, is set in the upper cylindrical opening of the tubular body 40. The first control knob 20 is fitted into the gap between the body 40 and the spool 10 from the front end of the spool 10, while the second control knob 30 is fitted into the gap between the spool 10 and the first control knob 20 from the front end of the spool 10. In a detailed description, two axial passages, or first and second passages 14 and 14a, are formed along the central axis of the spool 10 at the rear and front sections of the spool 10, respectively. A plurality of first radial holes 15 are regularly formed on the sidewall of the spool 10 at a position around the middle portion of the first axial passage 14, while a plurality of second radial holes 15a are regularly formed on the sidewall of the spool 10 at a position around the front end of the first axial passage 14. On the other hand, a plurality of third radial holes 15b are regularly formed on the sidewall of the spool 10 at a position around the rear end of the second axial passage 14a. An annular boss, having a first annular slope surface 16, is formed around the rear section of the spool 10 at a position behind the first radial holes 15.

A third external thread 12 is formed around the middle portion of the spool 10, with the first control knob 20 being movably externally engaging with the third thread 12 so as to be axially movable relative to the spool 10. When the first control knob 20 is fully tightened in a backward direction on the spool 10, the knob 20 is brought into close contact with the first annular slope surface 16 of the spool 10 at its rear end 24, thus closing the first radial holes 15. The external surface of the spool 10 is stepped in a way such that the outside diameter of the spool 10 around the third radial holes 15b is smaller than that around the second radial holes 15a, with a second annular slope surface 16a being formed along the annular step between the second and third radial holes 15a and 15b. A fourth external thread 13 is formed on the middle portion of the front section of the spool 10, with the second control knob 30 being movably externally engaging with the fourth thread 13 so as to be axially movable relative to the spool 10. When the second control knob 30 is fully tightened in a backward direction on the spool 10, the knob 30 is brought into close contact with the second annular slope surface 16a of the spool 10 at its interior annular step 32, thus closing the third radial holes 15b.

On the other hand, the air jet pipe 75, connected to the front end of the spool 10 using both an assembling member 79 and a fitting member 77, is inserted into the front portion of the suction tube 65 at its front end. The grip 44, having the on/off valve unit 80, is assembled with the first external thread 11 of the spool 10. The above on/off valve unit 80 comprises a housing having a vertical cavity 86 at its center, with a cock 90 being vertically set in the vertical cavity 86 so as to project upwardly from the top of the valve body at its top end. A radial hole 84 is formed on the sidewall of the housing of the on/off valve unit 80. An inclined hole 46 is formed in the front portion of the grip 44 at a position outside the radial hole 84 of the on/off valve unit 80 and communicates with the first axial passage 14 of the spool 10. A valve, with an annular slope surface 92, is formed at the lower end of the cock 90 and is normally biased upwardly by a compression coil spring 94, thus normally closing the lower end of the vertical cavity 86 of the on/off valve 80. An actuation lever 48, hinged to the top surface of the grip 44 using a pin, comes into contact with the top end of the cock 90 at its middle portion, with the cock 90 projecting outside the top of the valve housing of the on/off valve 80.

Figure 4A:
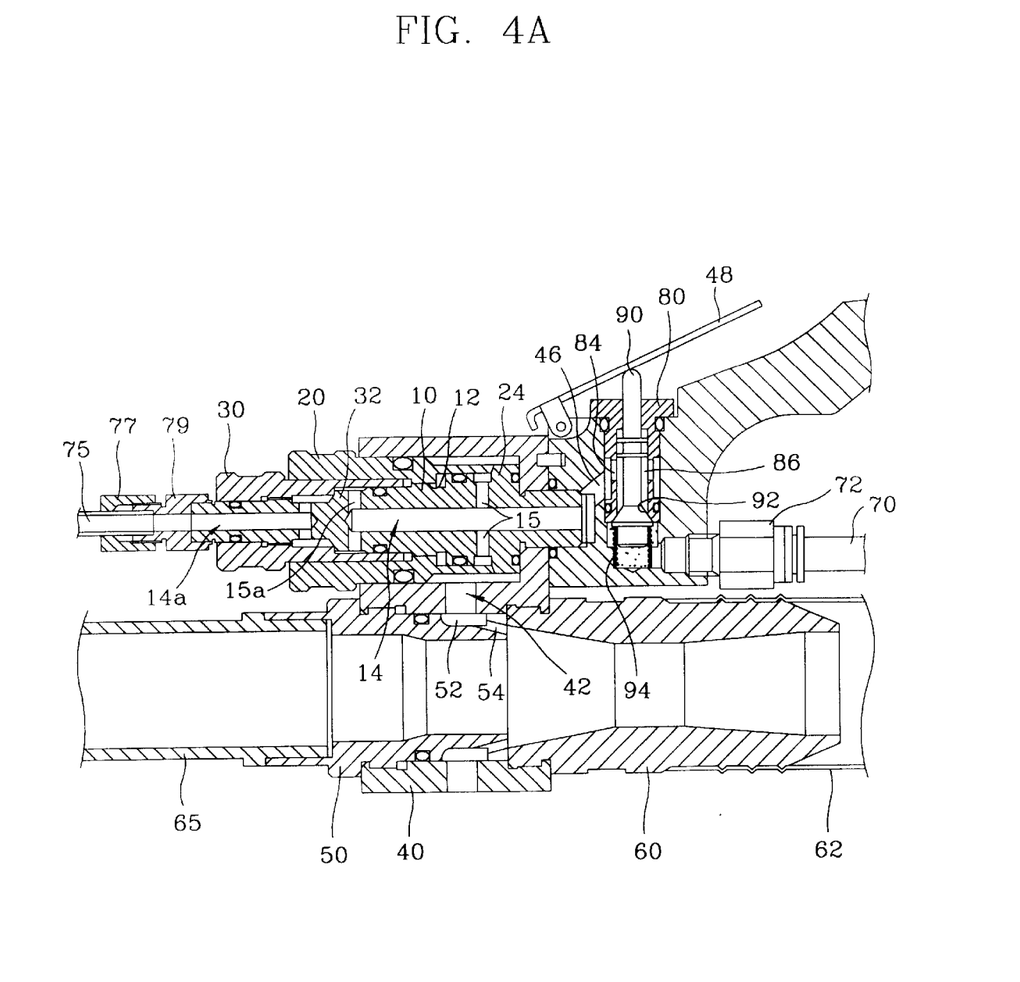
FIG. 4a is an enlarged sectional view, showing the construction of the important part of the air gun of FIG. 1 in more detail.
Figure 4B:
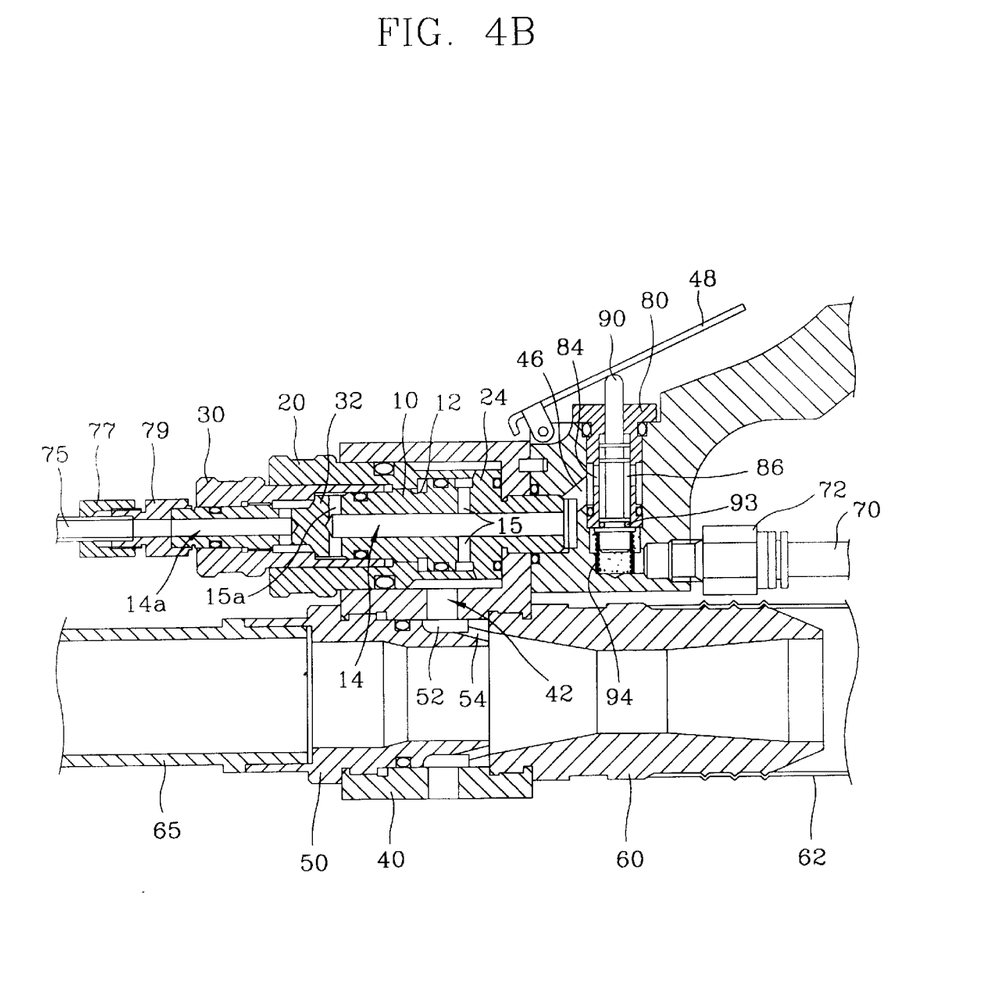
FIG. 4b is a view corresponding to FIG. 4a, but showing an air gun provided with an on/off valve unit modified according to a modification of the preferred embodiment of this invention.

FIG. 4a shows the air gun in a normal position wherein the actuation lever 48 is not operated. In the normal position of FIG. 4a, the cock 90 is fully biased upwardly by the compression coil spring 94, thus closing the lower end of the cavity 86 of the on/off valve housing at the annular slope surface 92. On the other hand, FIG. 4b is a view corresponding to FIG. 4a, but showing an on/off valve unit 80 according to a modification of the preferred embodiment of this invention. In the modification of FIG. 4b, the cock 90 is free from the annular slope surface 92, but an O-ring 93 is fitted over the lower end portion of the cock 90. In the normal position of the air gun of FIG. 4b, the O-ring 93 closes the lower end of the cavity 86 of the on/off valve housing.

The lower end of the on/off valve unit 80 is connected to the air supply tube 70 through a pipe fitting member 72, thus communicating with the tube 70.

The multifunctional air gun of this invention is operated as follows.

Figure 5:
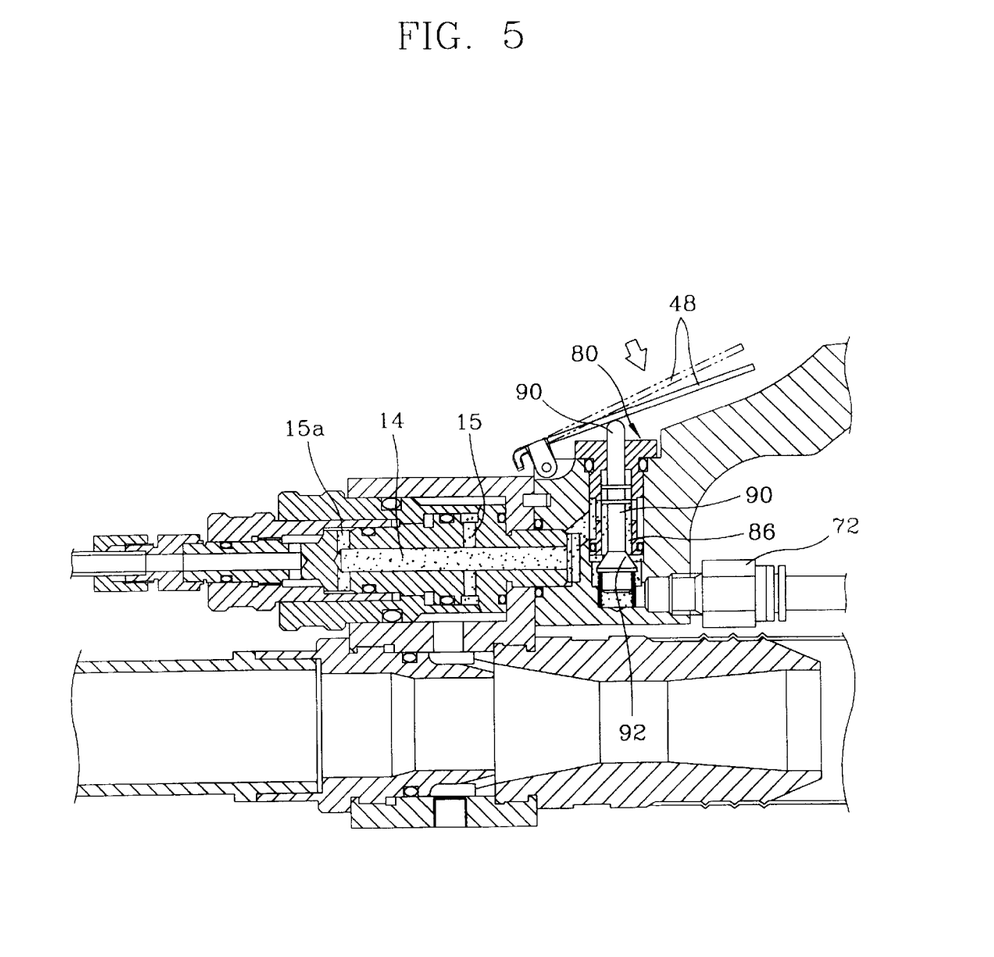
FIG. 5 is a view corresponding to FIG. 4a, but showing compressed air introduced into the fixed spool within the above air gun in response to an operation of an on/off valve unit when the air gun remains in a neutral mode.

When the actuation lever 48 presses down the cock 90 of the on/off valve unit 80, by a user, as shown in FIG. 5, the cock 90 moves downwardly while compressing the spring 94. The annular slope surface 92 (or the O-ring 93 in the case of the modification of FIG. 4b) of the cock 90 is thus separated from the lower end of the cavity 86 and opens the cavity 86. Therefore, compressed air is introduced from the tube 70 into the cavity 86 and passes through the radial hole 84 of the valve housing and the inclined hole 46 of the grip 44 prior to being led into the first axial passage 14 of the spool 10. In the normal position of FIGS. 4a and 4b, both control knobs 20 and 30 are fully tightened, and so the first and second radial holes 15 and 15a are closed. That is, the compressed air passages for both the air jet pipe 75 and the vacuum valve unit 50 are closed, and so the air gun performs no operation even when the lever 48 presses the cock 90 down.

Figure 6:
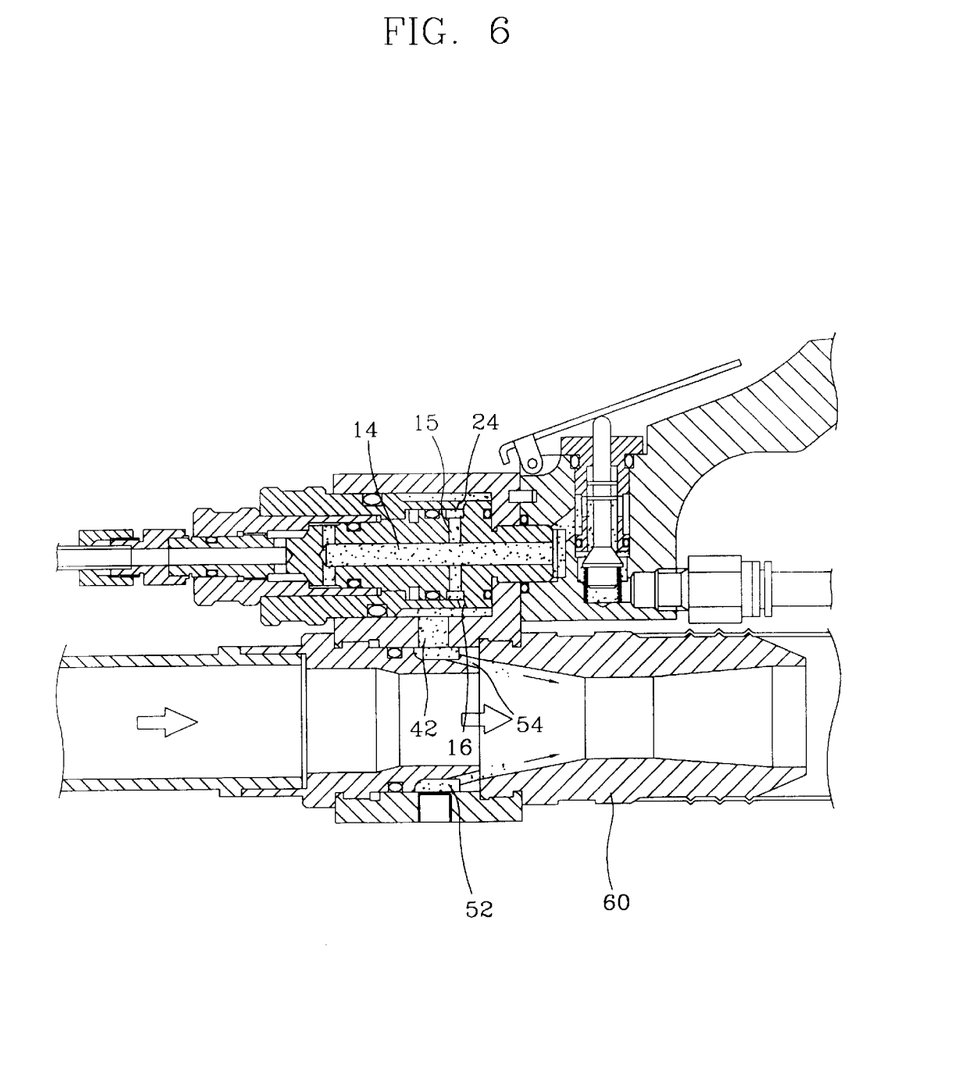
FIG. 6 is a view corresponding to FIG. 5, but showing the circulation of compressed air within the above air gun during a sucking operational mode of the air gun.

When it is necessary to use the multifunctional air gun in a sucking operational mode, the first control knob 20 is primarily loosened so as to move forward. In such a case, the first annular slope surface 16 of the spool 10 is released from the rear end 24 of the knob 20 and opens the first radial holes 15 of the spool 10 as shown in FIG. 6. When the cock 90 of the on/off valve unit 80 is pressed down by the lever 48 in the above position, compressed air from the air supply tube 70 flows in the order of the cavity 86 of the on/off valve housing, the first axial passage 14, the first radial holes 15 and a radial hole 42 of the tubular body 40 prior to being strongly injected into the vacuum valve unit 50 through the nozzle holes 54. In such a case, the interior of both the vacuum valve unit 50 and the suction tube 65 is vacuumized due to an air pressure difference, thus sucking impurities, such as dust and chips, from the atmosphere. The sucked impurities within the air gun flow through the exhaust duct 62 by the suction force so as to reach the dust collector.

Figure 7:
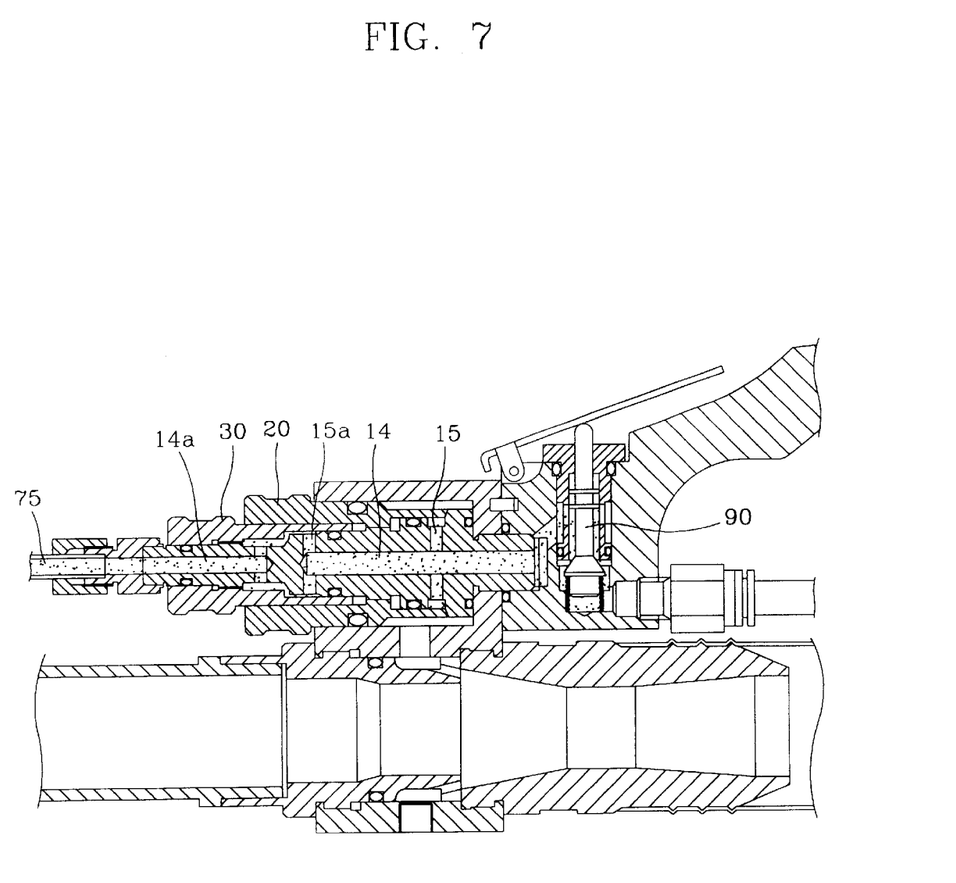
FIG. 7 is a view corresponding to FIG. 5, but showing the circulation of compressed air within the above air gun during a blowing operational mode of the air gun.
Figure 8:
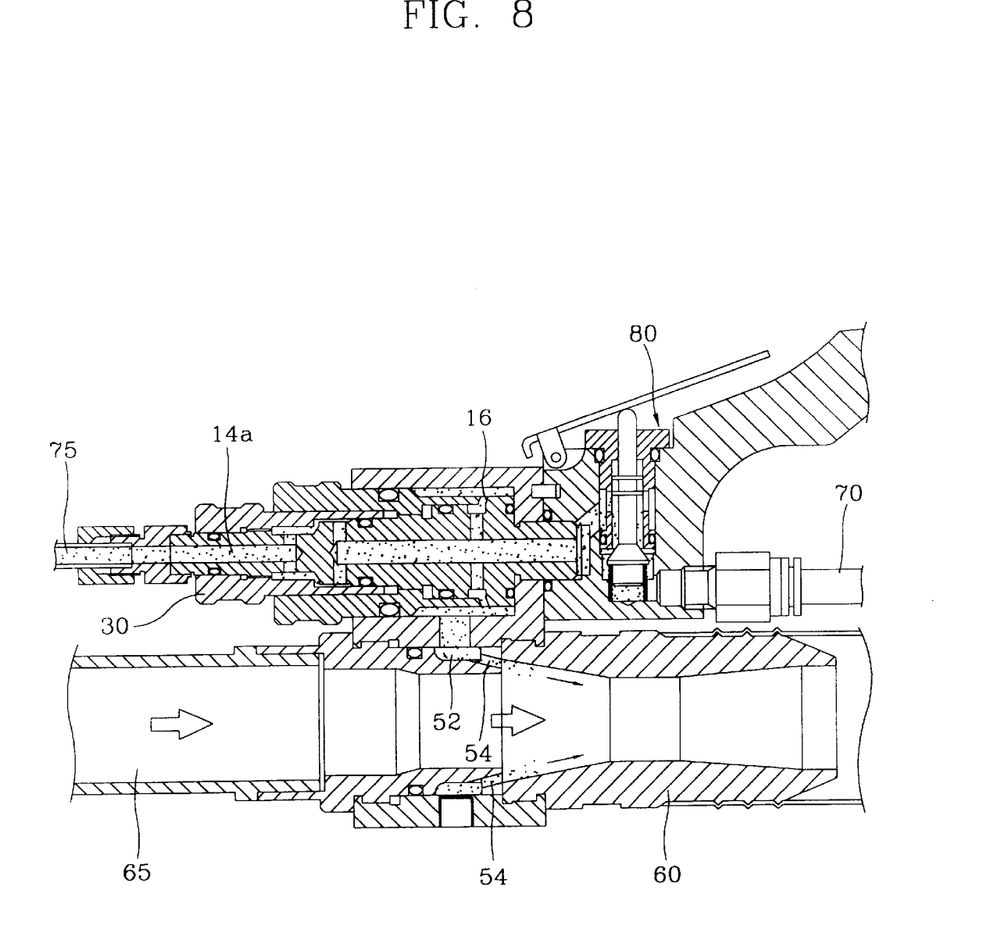
FIG. 8 is a view corresponding to FIG. 5, but showing the circulation of compressed air within the above air gun during a sucking and blowing operational mode of the air gun.

When it is necessary to use the air gun in a blowing operational mode, the second control knob 30 of FIG. 5 is primarily loosened so as to move forward. In such a case, the second annular slope surface 16a of the spool 10 is released from the interior annular step 32 of the knob 30 and opens the second radial holes 15a of the spool 10 as shown in FIG. 7. When the cock 90 of the on/off valve unit 80 is pressed down by the lever 48 in the above position, compressed air from the air supply tube 70 flows in the order of the cavity 86 of the on/off valve housing, the first axial passage 14, the second radial holes 15a, the third radial holes 15b and the second axial passage 14a of the spool 10 prior to being fed into the air jet pipe 75. During such a blowing operational mode, the first control knob 20 closes the first axial holes 15 of the spool 10. When the first control knob 20 in the above position is loosened to open the first axial holes 15, the air gun performs the sucking operation and the blowing operation at the same time as shown in FIG. 8. In a practical use of the air gun, a user selects an operational mode by appropriately manipulating the first and/or second control knobs 20 and 30 as desired prior to operating the on/off valve unit 80.

As described above, the present invention provides a multifunctional air gun, which is designed to selectively perform a sucking operation, a blowing operation, or the two operations at the same time as desired, with the operational mode of the air gun being easily controllable. The air gun of this invention thus accomplishes a desired operational effect during a cleaning operation. The multifunctional air gun of this invention also has a simple construction suitable for reducing the production cost while manufacturing the air guns. In the air gun of this invention, it is possible to freely control the flow rate of compressed air as desired. This finally allows the air gun to almost completely remove a variety of impurities, regardless of the size of the impurities, if the impurities pass through the passages within the air gun. Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A multifunctional air gun, comprising:
   a tubular body provided with an on/off valve unit for controlling a supplying of compressed air from an air supply tube, said tubular body also having upper and lower openings communicating with each other;
   a fixed spool set within said upper opening of the tubular body, said fixed spool connecting the air supply tube to an air jet pipe while controlling a flowing direction of the compressed air;
   a vacuum valve unit set within said lower opening of the tubular body and assembled with an impurity suction nozzle and an impurity exhaust nozzle at both ends thereof while allowing the suction and exhaust nozzles to communicate with each other, said vacuum valve unit adapted for vacuumizing the interior of the two nozzles due to the compressed air supplied from the fixed spool;
   a first control knob assembled with said fixed spool and adapted for controlling the compressed air flowing from the fixed spool into the vacuum valve unit while controlling a suction force generated by the compressed air for the vacuum valve unit; and
   a second control knob assembled with said fixed spool and adapted for controlling the compressed air flowing from the spool into the air jet pipe while controlling a blowing force generated by the compressed air for the air jet pipe.

2. The multifunctional air gun according to claim 1, wherein said on/off valve unit comprises:
- a valve housing having a vertical cavity, with the air supply tube communicating with an interior of said fixed spool through the cavity; and
- a cock vertically and movably set in the cavity of the valve housing and adapted for selectively opening or closing the cavity.

3. The multifunctional air gun according to claim 2, wherein an O-ring is fitted over said cock so as to selectively open the cavity when the cock is moved downwardly.

4. The multifunctional air gun according to claim 3, wherein said cock is normally biased upwardly by a spring, thus normally closing the cavity when the cock is free from an external force.

5. The multifunctional air gun according to claim 3, wherein a radial hole is formed on the valve housing of the on/off valve unit so as to allow the cavity to communicate with the interior of said fixed spool.

6. The multifunctional air gun according to claim 3, wherein an actuation lever is hinged to the tubular body at a position around the on/off valve unit, said lever selectively pressing down the cock so as to allow the cock to open the cavity of the on/off valve housing as desired.

7. The multifunctional air gun according to claim 1, wherein first and second axial passages are formed within said fixed spool at rear and front sections of the spool.

8. The multifunctional air gun according to claim 7, further comprising:
- first and second radial holes formed on a sidewall of said fixed spool at positions around rear and front portions of the first axial passage so as to allow the first axial passage to communicate with an outside of the fixed spool; and
- a third radial hole formed on the sidewall of said fixed spool at a position around the second axial passage so as to allow the second axial passage to communicate with the outside of the fixed spool.

9. The multifunctional air gun according to claim 7, further comprising:
- a first external thread formed on a rear end of said fixed spool and adapted for engaging with the tubular body while allowing the interior of the fixed spool to communicate with the cavity of said on/off valve housing; and
- a second external thread formed on a front end of said fixed spool and adapted for engaging with an assembling member locked to said air jet pipe, thus allowing the interior of the fixed spool to communicate with the air jet pipe.

10. The multifunctional air gun according to claim 7, further comprising:
- a third external thread formed on said fixed spool at a position around the first axial passage, with the first control knob externally and movably engaging with the third external thread so as to be movable along the fixed spool; and
- a fourth external thread formed on said fixed spool at a position around the second axial passage, with the second control knob externally and movably engaging with the fourth external thread so as to be movable along the fixed spool.

11. The multifunctional air gun according to claim 8, further comprising:
- a first annular slope surface externally formed on said fixed spool at a position around the first radial hole and selectively brought into contact with or separated from the first control knob, thus selectively closing or opening the first radial hole and controlling the suction force generated by the compressed air flowing from the first radial hole into the vacuum valve unit; and
- a second annular slope surface externally formed on said fixed spool at a position around the third radial hole and selectively brought into contact with or separated from the second control knob, thus selectively closing or opening the third radial hole and controlling the blowing force generated by the compressed air flowing from the third radial hole into the air jet pipe.

12. The multifunctional air gun according to claim 11, wherein said first control knob is selectively brought into contact with or separated from the first annular slope surface of the fixed spool at its rear end, thus selectively closing or opening the first radial hole of the fixed spool.

13. The multifunctional air gun according to claim 11, wherein said second control knob is provided with an annular step for being selectively brought into contact with or separated from the second annular slope surface of the fixed spool at the annular step, thus selectively closing or opening the third radial hole of the fixed spool.

14. The multifunctional air gun according to claim 11, wherein a first annular gap is defined between said fixed spool and the upper opening of said tubular body while commonly covering the first radial hole and the first annular slope surface of the fixed spool.

15. The multifunctional air gun according to claim 11, wherein a second annular gap is defined between said fixed spool and said second control knob while commonly covering the second and third radial holes and the second annular slope surface of the fixed spool.

16. The multifunctional air gun according to claim 1, wherein an annular groove is exteriorly and circumferentially formed on a rear end portion of said vacuum valve unit, with a plurality of inclined nozzle holes being formed on the vacuum valve unit while extending backwardly from said annular groove so as to communicate with an interior of said impurity exhaust nozzle.

17. The multifunctional air gun according to claim 1, wherein an operational mode of said air gun is selected from a sucking operational mode, a blowing operational mode and a sucking and blowing operational mode by manipulating said first and second control knobs.

* * * * *